United States Patent
Kinose et al.

(10) Patent No.: US 7,045,561 B2
(45) Date of Patent: May 16, 2006

(54) MODIFIED RED PHOSPHORUS, METHOD OF PRODUCING THE SAME, DECOLORIZED RED PHOSPHORUS COMPOSITION AND FLAME-RETARDANT POLYMER COMPOSITION

(75) Inventors: Yutaka Kinose, Tokyo (JP); Akinori Inoue, Tokyo (JP); Takahiro Nishita, Tokyo (JP); Takahiro Nagayama, Tokyo (JP)

(73) Assignee: Nippon Chemical Industrial Co., Ltd., Koto-ku (JP)

( * ) Notice: Subject to any disclaimer, the term of this patent is extended or adjusted under 35 U.S.C. 154(b) by 251 days.

(21) Appl. No.: 10/618,728

(22) Filed: Jul. 15, 2003

(65) Prior Publication Data
US 2004/0063815 A1    Apr. 1, 2004

(30) Foreign Application Priority Data
Jul. 18, 2002    (JP)    ............................ 2002-209463

(51) Int. Cl.
*C08K 3/32*    (2006.01)
*C08K 9/00*    (2006.01)

(52) U.S. Cl. ...................... 523/205; 523/202; 523/206; 523/210; 523/223; 524/80; 524/414

(58) Field of Classification Search ................ 523/202, 523/205, 206, 210, 223; 524/80, 414
See application file for complete search history.

(56) References Cited

U.S. PATENT DOCUMENTS 5,543,444 A * 8/1996 Kobayashi et al. ......... 523/205

FOREIGN PATENT DOCUMENTS

| JP | 51-105996 A | 9/1976 |
| JP | 59-195512 A | 11/1984 |
| JP | 2000-169119 A | 6/2000 |

* cited by examiner

Primary Examiner—Kriellion A. Sanders
(74) Attorney, Agent, or Firm—Smith Patent Office

(57) ABSTRACT

The present invention provides a decolorized red phosphorus composition capable of inhibiting coloring in dark red peculiar to red phosphorus even when kneaded with a resin or the like, modified red phosphorus used for the decolorized red phosphorus composition and a production method therefor, and a flame-retardant polymer composition using the decolorized red phosphorus composition. The modified red phosphorus includes red phosphorus particles (A) whose surfaces are coated with a modified resin film (F) containing white particles (B) having a whiteness of 70 or more, color particles (C) having a hue H of 30 to 80 in the Munsell color-system hue circle, and a binder resin (D). The decolorized red phosphorus composition includes a mixed powder containing the modified red phosphorus and white particles (B) having a whiteness of 70 or more. The flame-retardant polymer composition contains the decolorized red phosphorus composition and a polymer compound (I).

21 Claims, No Drawings

MODIFIED RED PHOSPHORUS, METHOD OF PRODUCING THE SAME, DECOLORIZED RED PHOSPHORUS COMPOSITION AND FLAME-RETARDANT POLYMER COMPOSITION

BACKGROUND OF THE INVENTION

1. Field of the Invention

The present invention relates to modified red phosphorus, a method of producing the same, a decolorized red phosphorus composition capable of suppressing coloring in dark red peculiar to red phosphorus when kneaded with a resin, modified red phosphorus used for the decolorized red phosphorus composition and a production method therefor, and a flame-retardant polymer composition using the decolorized red phosphorus composition.

2. Description of the Related Art

Red phosphorus is known to impart an excellent flame-retardant effect to synthetic resins. However, when red phosphorus is singly used, a hydrolysis reaction occurs by contact with air moisture to produce a phosphine gas, and thus red phosphorus cannot be used without modification. Therefore, modified red phosphorus stabilized by coating with an organic or inorganic material has been conventionally proposed. For example, Japanese Unexamined Patent Application Publication No. 51-105996 discloses modified red phosphorus coated with a thermosetting resin. However, the modified red phosphorus cannot be used for synthetic resins having a problem of color tones of products because the modified red phosphorus generally assumes dark red.

On the other hand, in Japanese Unexamined Patent Application Publication No. 59-195512, the applicant of the present invention discloses a method of concealing or decolorizing a dark red color peculiar to red phosphorus by using stabilized modified red phosphorus to enable free coloring of a resin which is rendered flame-retardant. The modified red phosphorus obtained by this method is red phosphorus coated with titanium oxide and an organic polymer, and concealing and decolorization of the dark red color of red phosphorus are significantly improved.

In Japanese Unexamined Patent Application Publication No. 2000-169119, the applicant also discloses a decolorized red phosphorus composition comprising modified red phosphorus and at least one inorganic pigment powder selected from oxides, hydroxides and phosphates of Zn, Al, Mg, Ti, and the like, the modified red phosphorus containing red phosphorus particles (A1) whose surfaces are coated with an inorganic pigment by reaction of a cationic water-soluble resin and an anionic surfactant or nonionic surfactant. Since the decolorized red phosphorus composition contains the modified red phosphorus and the inorganic pigment powder, a blend with a resin has an improved degree of concealing or decolorization of the dark red color of red phosphorus, as compared with a mixture of only modified red phosphorus and a resin.

However, when the decolorized red phosphorus composition disclosed in Japanese Unexamined Patent Application Publication No. 2000-169119 is sufficiently kneaded with a resin or rapidly kneaded with a resin, the inorganic pigment used as a decolorizing component diffuses into the resin from the peripheries of the modified red phosphorus particles to decrease the amount of the pigment in the peripheries of the modified red phosphorus particles. Therefore, a decolorization property deteriorates to cause the problem of leaving a light red hue in the resin after mixing.

SUMMARY OF THE INVENTION

Accordingly, it is an object of the present invention to provide a decolorized red phosphorus composition capable of suppressing coloring in dark red peculiar to red phosphorus when mixed with a resin or the like, modified red phosphorus used for the decolorized red phosphorus composition and a production method therefor, and a flame-retardant polymer composition using the decolorized red phosphorus composition.

In consideration of the present conditions, the inventors carried out further studies. As a result, it was found that a mixed powder containing modified red phosphorus which comprises red phosphorus-containing particles (A) whose surfaces are coated with a modified resin film (F) containing specified white particles (B), color particles of a specified color (C) and a binder resin (D), and at least white particles (B) which are further uniformly mixed in the modified red phosphorus can suppress coloring in dark color peculiar to red phosphorus even when kneaded with a resin, and thus the mixed powder is suitable as a decolorized red phosphorus composition. This finding led to the achievement of the present invention.

Modified red phosphorus of the present invention comprises red phosphorus-containing particles (A) whose surfaces are coated with a modified resin film (F) containing white particles (B) having a whiteness of 70 or more, color particles (C) having a hue H of 30 to 80 in the Munsell color-system hue circle, and a binder resin (D).

A method of producing modified red phosphorus of the present invention comprises performing a curing reaction of a binder resin (D) in an aqueous slurry containing red phosphorus-containing particles (A) whose surfaces are coated with a modified resin film (F) containing white particles (B) having a whiteness of 70 or more, and color particles (C) having a hue H of 30 to 80 in the Munsell color-system hue circle.

A decolorized red phosphorus composition of the present invention comprises a mixed powder containing the modified red phosphorus and the white particles (B) having a whiteness of 70 or more.

A flame-retardant polymer composition of the present invention comprises the decolorized red phosphorus composition and a polymer compound (I).

DESCRIPTION OF THE PREFERRED EMBODIMENTS (Modified Red Phosphorus)

Modified red phosphorus according to the present invention comprises red phosphorus-containing particles (A) whose surfaces are coated with a modified resin film (F) containing white particles (B) having a whiteness of 70 or more, color particles (C) of a specified color, and a binder resin (D).

In the present invention, the red phosphorus-containing particles (A) include red phosphorus particles (A1) composed of only red phosphorus, and coated red phosphorus particles obtained by forming a coating layer other than the modified resin film (F), which will be described below, on the surfaces of the red phosphorus particles (A1). Examples of the coated red phosphorus particles include red phosphorus particles (A1) whose surfaces are coated with an inorganic material, red phosphorus particles (A1) whose surfaces are coated with an organic material, red phosphorus particles (A1) whose surfaces are coated with an organic material containing an inorganic material, red phosphorus particles (A1) whose surfaces are plated by electroless nickel plating, red phosphorus particles (A1) whose surfaces are coated with an inorganic material and then coated with an organic material, red phosphorus particles (A1) whose surfaces are coated with an inorganic material and then coated with an organic material containing an inorganic material, and the like.

Of these red phosphorus-containing particles (A), the red phosphorus particles (A1), coated red phosphorus particles (referred to as "stabilized red phosphorus (A2)") obtained by coating the surfaces of the red phosphorus particles (A1) with an inorganic material, coated red phosphorus particles (referred to as "stabilized red phosphorus (A3)") obtained by coating the surfaces of the red phosphorus particles (A1) with a thermosetting resin, and coated red phosphorus particles (referred to as "double-coated stabilized red phosphorus (A4)") obtained by coating the surfaces of the red phosphorus particles (A1) with an inorganic material and then further coating the surfaces with a thermosetting resin are preferred as the red phosphorus-containing particles (A) because of high moisture resistance and a small amount of $PH_3$ generated, as compared with other red phosphorus particles. The stabilized red phosphorus (A2) and stabilized red phosphorus (A3) are collectively simply referred to as "stabilized red phosphorus".

As the red phosphorus particles (A1), industrially available red phosphorus particles may be used, and the type, quality, shape, etc. are not limited. Examples of the red phosphorus particles (A1) include red phosphorus crushed particles and spherical particles, and the like.

The red phosphorus particles (A1) are preferably previously washed with an acid or alkali for suppressing elusion of phosphate ions, phosphite ions, and the like. Such treated red phosphorus particles (A1) can be used in a field required to have severe electrical insulation.

As the inorganic material used for the stabilized red phosphorus (A2), at least one oxide or hydroxide of a metal selected from Zn, Al, Mg, Ti, Si, Co, Zr, and Sn can be used. The inorganic material may be a hydrate or an anhydride.

The amount of the inorganic material coated on the stabilized red phosphorus (A2) is generally 1 to 20 parts by weight, and preferably 3 to 15 parts by weight, based on 100 parts by weight of the red phosphorus particles (A1). The reason for this is that the generation of phosphine gas from the stabilized red phosphorus contained in a flame-retardant polymer composition, which will be described below, and the elution of phosphate ions and phosphite ions can be suppressed, and flame retardancy can easily be imparted to the flame-retardant polymer composition.

Examples of the thermosetting resin used for the stabilized red phosphorus (A3) include a phenolic resin, a melamine resin, an epoxy resin, an unsaturated polyester resin, a phenol-formalin resin, an urea-formalin resin, a melamine-formalin resin, a furfuryl alcohol-formalin resin, and the like. These resins may be used singly or in a combination of at least two resins.

The amount of the thermosetting resin coated on the stabilized red phosphorus (A3) is generally 1 to 20 parts by weight, and preferably 1 to 10 parts by weight, in terms of the solid content based on 100 parts by weight of the red phosphorus particles (A1). The reason for this is the same as that for the amount of the inorganic material coated on the stabilized red phosphorus (A2).

The stabilized red phosphorus generally contains 70% by weight or more of red phosphorus, and preferably 85 to 98% by weight of red phosphorus. The reason for this is that with a red phosphorus content of less than 70% by weight, the flame retardancy cannot be easily imparted to the flame-retardant polymer composition, while with a red phosphorus content of over 98% by weight, the elution of phosphorus oxoacid is increased due to a small amount of coating, thereby increasing the amount of the phosphine generated.

In an example of a method of producing the stabilized red phosphorus (A2), generally 0.5 to 30 parts by weight, preferably 0.5 to 15 parts by weight, of a water-soluble metal salt of the inorganic material are added to a slurry containing 50 to 150 parts by weight of the red phosphorus particles (A1) dispersed in 1000 parts by weight of water. Then at least one alkali selected from inorganic alkalis such as ammonia gas, ammonia water, caustic soda, caustic potash, $NaHCO_3$, $Na_2CO_3$, $K_2CO_3$, $KHCO_3$, $Ca(OH)_2$, and the like, and organic alkalis such as ethanol amine, and the like is added to the slurry to adjust its pH value to 6 to 10 and to deposit the inorganic material on the surfaces of the red phosphorus particles (A1). After the completion of reaction, the particles are filtered off, washed and then dried in an inert gas atmosphere. In this method, washing is preferably performed until the electric conductivity of 10% slurry of the stabilized red phosphorus (A2) after washing is generally 1000 µS/cm or less, and preferably 500 µS/cm or less. The reason for this is that ionic impurities are decreased to permit the use of the stabilized red phosphorus (A2) for a polymer compound required to have insulation.

In an example of a method of producing the stabilized red phosphorus (A3), synthetic raw materials for the thermosetting resin or its initial condensation product is added to a slurry containing the red phosphorus particles (A1) dispersed in water, and then a polymerization reaction is performed under homopolyermization conditions for the thermosetting resin to coat the surfaces of the particles with the thermosetting resin. More specifically, when the thermosetting resin is a phenolic resin, generally 50 to 150 parts by weight, preferably 80 to 120 parts by weight, of the red phosphorus particles (A1) are first dispersed in 1000 parts by weight of water to prepare a slurry. Then, an alkali such as ammonia, sodium hydroxide, or the like or an acid such as hydrochloric acid, nitric acid, sulfuric acid, or the like is added to the red phosphorus slurry, and generally 1 to 30 parts by weight, preferably 1 to 15 parts by weight, (in terms of solid content) of the initial condensation product of the phenolic resin is added to the slurry. Then, a polymerization reaction is performed at 60 to 90° C. for 1 to 3 hours under stirring. After the completion of the reaction, the particles are filtered off, washed and then dried in an inert gas atmosphere. This polymerization reaction can be performed in the presence of a buffer comprising ammonium chloride or the like. In this method, washing is preferably performed until the electric conductivity of 10% slurry of the stabilized red phosphorus (A3) after washing is generally 1000 µS/cm or less, and preferably 500 µS/cm or less. The reason for this is that ionic impurities are decreased to permit the use of the stabilized red phosphorus (A3) for a polymer compound required to have insulation.

As the inorganic material for the double-coated stabilized red phosphorus (A4), the same materials as those used for the stabilized red phosphorus (A2) can be used. The amount of the inorganic material coated on the double-coated stabilized red phosphorus (A4) is generally 0.5 to 10 parts by weight, and preferably 0.5 to 5 parts by weight, based on 100 parts by weight of the red phosphorus particles (A1). The reason for this is the same as that for the amount of the inorganic material coated on the stabilized red phosphorus (A2).

In the double-coated stabilized red phosphorus (A4), the same thermosetting resins as those used for the stabilized red phosphorus (A3) can be used as the thermosetting resin for coating the surfaces of the red phosphorus particles (A1) coated with the inorganic material. The amount of the thermosetting resin coated on the double-coated stabilized red phosphorus (A4) is generally 1 to 15 parts by weight, preferably 3 to 10 parts by weight, in terms of the solid content based on 100 parts by weight of the red phosphorus particles (A1). The reason for this is the same as that for the amount of the inorganic material coated on the stabilized red phosphorus (A2).

The red phosphorus content of the double-coated stabilized red phosphorus (A4) is generally 70% by weight or more, and preferably 80 to 97% by weight. The reason for this is that with a red phosphorus content of less than 70% by weight, the flame retardancy cannot be easily imparted to the flame-retardant polymer composition, while with a red phosphorus content of over 97% by weight, the elution of phosphorus oxoacid is increased due to a small amount of coating, thereby increasing the amount of the phosphine generated.

In an example of a method of producing the double-coated stabilized red phosphorus (A4), generally 0.5 to 15 parts by weight, preferably 0.5 to 7.5 parts by weight, of a water-soluble metal salt of the inorganic material are added to a slurry containing 50 to 150 parts by weight of the red phosphorus particles (A1) dispersed in 1000 parts by weight of water. Then, at least one alkali selected from inorganic alkalis such as ammonia gas, ammonia water, caustic soda, caustic potash, $NaHCO_3$, $Na_2CO_3$, $K_2CO_3$, $KHCO_3$, $Ca(OH)_2$, and the like, and organic alkalis such as ethanol amine, and the like is added to the slurry to adjust its pH value to 6 to 10 and to deposit the inorganic material on the surfaces of the red phosphorus particles (A1). According to demand, the particles are filtered off and then pulp-washed. In this method, washing is preferably performed until the electric conductivity of 10% slurry after washing is generally 1000 μS/cm or less, and preferably 500 μS/cm or less. The reason for this is that the stabilized red phosphorus can be used for a polymer compound required to have high insulation. When the red phosphorus particles are coated with zinc hydroxide, the pH is preferably kept at 6.5 or more.

Next, synthetic raw materials for the thermosetting resin or its initial condensation product is added to the slurry, and then a polymerization reaction is performed under homopolyermization conditions for the thermosetting resin to further coat the thermosetting resin on the surfaces of the red phosphorus particles coated with the inorganic material. More specifically, when a phenolic resin is used as the thermosetting resin, generally 50 to 150 parts by weight, preferably 80 to 120 parts by weight, of the red phosphorus particles coated with the inorganic material are first dispersed in 1000 parts by weight of water to prepare a slurry. Then, an alkali such as ammonia, sodium hydroxide, or the like or an acid such as hydrochloric acid, nitric acid, sulfuric acid, or the like is added to the red phosphorus slurry, and generally 0.5 to 22 parts by weight, preferably 1.5 to 15 parts by weight, (in terms of solid content) of the initial condensation product of the phenolic resin is added to the slurry. Then, a polymerization reaction is performed under stirring at 60 to 90° C. for 1 to 3 hours. This polymerization reaction is preferably performed in the presence of a buffer comprising ammonium chloride or the like. After the completion of the reaction, the particles are filtered off, washed and then dried in an inert gas atmosphere to obtain the double-coated stabilized red phosphorus (A4) comprising the red phosphorus particles (A1) whose surfaces are coated with the inorganic material and the thermosetting resin. In this method, washing is preferably performed until the electric conductivity of 10% slurry of the double-coated stabilized red phosphorus (A4) after washing is generally 1000 μS/cm or less, and preferably 500 μS/cm or less. The reason for this is that the double-coated stabilized red phosphorus (A4) can be used as a raw material for a flame-retardant polymer composition required to have high electrical insulation.

In the present invention, the red phosphorus-containing particles (A) other than the red phosphorus particles (A1) generally have an average particle diameter of 100 μm or less, preferably 1 to 30 μm, and more preferably 5 to 20 μm, which is determined by laser diffractometry. The reason for this is that with a particle diameter of over 100 μm, dispersibility of the modified red phosphorus mixed in a polymer compound deteriorates to undesirably cause a difficulty in sufficiently imparting flame retardancy to the flame-retardant polymer composition.

The red phosphorus particles (A1) used as the red phosphorus-containing particles (A) generally have an average particle diameter of 1 to 100 μm, preferably 1 to 30 μm, and more preferably 5 to 20 μm, which is determined by laser diffractometry. The reason for this is that an average particle diameter of over 100 μm is undesirable for the same reason as described above. On the other hand, with a particle diameter of less than 1 μm, the red phosphorus particles (A1) are excessively smaller than the white particles (B) and the color particles (C) to cause a technical difficulty in forming the modified resin film (F) described below on the surfaces of the red phosphorus particles (A1), thereby undesirably easily causing a defect in the modified resin film (F). When the red phosphorus-containing particles (A) are the red phosphorus particles (A1), the red phosphorus particles (A1) more preferably contain 5% by weight or less, preferably 1% by weight or less, of particles having a particle diameter of less than 1 μm in order to decrease the generation of phosphorus oxoacid and phosphine due to oxidative decomposition.

The modified red phosphorus of the present invention comprises the red phosphorus-containing particles (A) whose surfaces are coated with the modified resin film (F) containing the white particles (B) having a specified whiteness, the color particles (C) having a specified hue range, and the binder resin (D).

The white particles (B) used in the present invention generally have a whiteness of 70 or more. In the present invention, the whiteness is measured by the reflectance system according to JIS Z 8722 using a powder whiteness meter. Specifically, assuming that reflectance of a sample surface to which white smoke (fine particles of magnesium oxide) is adhered by burning a magnesium ribbon is a whiteness of 100, and a reflectance of 0 is a whiteness of 0, the range between the degrees of whiteness 0 and 100 is divided into 100 equal parts. Therefore, the sample reaches white as the value of whiteness increases, and the sample reaches black as the value of whiteness decreases.

The white particles (B) serve as a component for concealing a dark red-brown color possessed by the red phosphorus particles (A1), adsorbing phosphine gas generated by decomposition of red phosphorus, and chemically fixing phosphorus oxoacids such as phosphoric acid, phosphorous acid, and the like generated by hydrolysis. Examples of the white particles (B) include particles of normal salts or basic salts such as carbonates such as calcium carbonate, barium carbonate, $2PbCO_3 \cdot Pb(OH)_2$, and the like; oxides such as CaO, MgO, ZnO, $TiO_2$, $ZrO_2$, $Sb_2O_3$, $Al_2O_3$, and the like;

hydroxides such as aluminum hydroxide, magnesium hydroxide, zinc hydroxide, and the like; sulfates such as calcium sulfate, barium sulfate, lead sulfate, strontium sulfate, $2PbSO_4.Pb(OH)_2$, and the like; nitrates such as $Bi(OH)_2.NO_3$, and the like; chlorides such as $PbCl_2.Pb(OH)_2$, and the like; silicates such as silicon dioxide, calcium silicate, kaoline, bentonite, $PbSiO_3$, $3MgO.4SiO_2.H_2O$, and the like; metal phosphites such as magnesium phosphite, calcium phosphite, barium phosphite, strontium phosphite, zinc phosphite, aluminum phosphite, zinc calcium phosphite, zinc potassium phosphite, and the like; metal phosphates such as magnesium phosphate, calcium phosphate, barium phosphate, strontium phosphate, zinc phosphate, aluminum phosphate, zinc magnesium phosphate, zinc calcium phosphate, zinc potassium phosphate, hydroxyapatite, and the like; condensed phosphates such as calcium polyphosphate, magnesium polyphosphate, zinc polyphosphate, aluminum polyphosphate, and the like; metal molybdates such as zinc molybdate, calcium molybdate, barium molybdate, aluminum molybdate, magnesium molybdate, strontium molybdate, zinc calcium molybdate, zinc potassium molybdate, and the like; metal borates such as zinc borate, calcium borate, barium borate, aluminum borate, magnesium borate, strontium borate, zinc calcium borate, zinc potassium borate, and the like; metal borosilicates such as zinc borosilicate, calcium borosilicate, barium borosilicate, aluminum borosilicate, magnesium borosilicate, strontium borosilicate, zinc potassium borosilicate, zinc calcium strontium borosilicate, calcium strontium zinc borosilicate, and the like; metal phosphosilicates such as zinc phosphosilicate, calcium phosphosilicate, barium phosphosilicate, aluminum phosphosilicate, magnesium phosphosilicate, strontium phosphosilicate, zinc potassium phosphosilicate, zinc calcium phosphosilicate, calcium strontium zinc phosphosilicate, and the like; metal tungstates such as barium tungstate, calcium tungstate, and the like; metal titanates such as magnesium titanate, zinc titanate, and the like; calcium sulfide; zinc sulfide; $ZnS.BaSO_4$; $MnCO_3$; and the like. The white particles (B) may be a hydrate or anhydride. Of these particles, particles of normal salts or basic salts of titanium dioxide, zinc oxide, and hydroxyapatite are preferred because of their high ability to conceal a dark red-brown color possessed by red phosphorus, and a normal salt or basic salt of titanium dioxide is more preferred. In the present invention, a type of the white particles (B) or a combination of at least two types may be used.

The white particles (B) generally has an average particle diameter of 0.2 to 10 μm, preferably 0.3 to 5 μm, and more preferably 0.3 to 1 μm, which is determined by laser diffractometry. The average particle diameter within the above range is preferred because the surfaces of the red phosphorus-containing particles (A) are effectively coated with the white particles (B) through the binder resin (D) to increase the power of concealing the color of the red phosphorus-containing particles (A). On the other hand, the average particle diameter of less than 0.2 μm is undesirable because of the insufficient power of concealing the color.

The color particles (C) used in the present invention have a hue H of 30 to 80 in the Munsell color-system hue circle. The hue H continuously changes and is represented by a numerical value of 0 to 100. A value 0 corresponds to a region from nearly purplish red to red, a value 10 corresponds to a region from nearly red to orange, a value 20 corresponds to a region from nearly orange to yellow, a value of 30 corresponds to a region from nearly yellow to yellow-green, a value of 40 corresponds to a region of nearly green, a value of 50 corresponds to a region from nearly green to blue-green, a value of 60 corresponds to a region of nearly blue-green, a value of 70 corresponds to a region of nearly blue, a value of 80 corresponds to a region of nearly bluish purple, and a value of 90 corresponds to a region of nearly purplish red. Furthermore, a value of 100 is coincided with 0 so that the hue continuously changes from 0 to 100. The hue H of 30 to 80 corresponds to a region from nearly yellow-green to bluish purple, which region corresponds to a color region substantially complementary to the red region. In the present invention, the color particles (C) and the white particles (B) are dispersed in the binder resin (D) for forming the modified resin film (F) on the surfaces of the red phosphorus-containing particles (A), thereby effectively causing decolorization.

In the present invention, green particles or blue particle are preferably used as the color particles (C) because the color of these particles is complementary to a red-brown color to decolorize a red color of red phosphorus by the color particles (C). The green particles or blue particles do not strictly belong to the green region or blue region in the Munsell color-system hue circle, but blue-green particles of an intermediate color between green and blue colors are also included in either the green particles or blue particles. Namely, in the Munsell color-system hue circle, the blue-green region (H of substantially 50 to 63) is present between the green region (H of substantially 38 to 50) and the blue region (H of substantially 63 to 78), and the region of hues H of 30 to 80 is roughly divided into three regions. However, the green particles represent particles in a region including the green region and the adjacent blue-green region, and have a hue H of 38 or more and less than 63, and the blue particles represent particles in the blue region and have a hue H of 63 or more and less than 78. The color particles (C) may comprise an organic or inorganic material.

In the present invention, for example, green pigment particles are used as the green particles. Examples of a green pigment include organic green pigments such as a phthalocyanine pigment, a thioindigo pigment, an anthraquinone pigment, and a dioxazine pigment; inorganic green pigments such as $CuCo_3.Cu(OH)_2$, $Cr_2O_3$, $Cr_2O_3.2H_2O$, $Cu(OH)_2$, $CuCl_2.3CuO.6H_2O$, $CoCr_2O_4$, $CuAsO_3.Cu(OH)_2$, $Cu(C_2H_3O_2)_2.3Cu(AsO_2)_2$, $Cu(C_2H_3O_2)_2.Cu(OH)_2$, $Cr(PO_3)_3$, $CoO.nZnO$, $CuO.SnO_2$, a mixture (chrome green) of chrome yellow and iron blue, a mixture (zinc green) of zinc yellow and iron blue, a mixture (cobalt chrome green) of $Cr_2O_3$, $CoO$ and $Al_2O_3$, $BaMnO_4$, green earth, $CuO.SiO_2$, $CuSO_4.3Cu(OH)_2.4H_2O$, $Cu(BO_2)_2$, $4CuO.P_2O_5$, iron green, Mars green, and the like. These green pigments can be used singly or in a combination of at least two of these pigments.

In the present invention, for example, blue pigment particles are used as the blue particles. Examples of a blue pigment include phthalocyanine blue, ultramarine blue, iron blue, $Fe_3(PO_4)_2.8H_2O$, $CoO.nAl_2O_3$, $CoO.nSnO_2$, $CoTiO_2$, a mixture (manganese blue) of $BaMnO_3$ and $BaSO_4$, molybdenum blue, $W_3O_5$, Egyptian blue, $2CuO_3.Cu(OH)_2$, a mixture (lime blue) of $Cu(OH)_2$ and $CaSO_4$, $CuS$, $Cu(BO_2)_2$, antimony blue, and the like. These blue pigments can be used singly or in a combination of at least two of these pigments.

As the color particles (C), a mixture of plural types of color particles can be prepared so that the hue after mixing is in the above-described hue range, and used. An example of the mixture is a mixture of blue particles and yellow particles which are uniformly mixed to produce green particles as a whole.

As the yellow particles, for example, yellow pigment particles can be used. Examples of a yellow pigment include an anthraquinone pigment, an isoindolinone pigment, a β-naphthol pigment, a pyrazolone pigment, a monoazo yellow pigment, a disazo yellow pigment, a condensed azo pigment, and the like. These yellow pigments can be used singly or in a combination of at least two of these pigments.

In the present invention, phthalocyanine green, phthalocyanine blue, dichromium trioxide, ultramarine blue and iron blue are preferably used for the color particles (C) because of the high performance of concealing a dark red color possessed by red phosphorus.

The color particles (C) preferably comprise appropriately fine particles from the viewpoint of dispersibility in the raw material (D) of the binder resin (D) and concealing power. Therefore, the average particle diameter of the color particles (C), which is measured by the laser diffractometry, is generally 0.2 to 10 μm, preferably 0.3 to 5 μm, and more preferably 0.3 to 1 μm. However, with an average particle diameter of less than 0.2 m, the color particles (C) are undesirably short of concealing power because of the excessively small diameter.

In the present invention, the binder resin (D) is used for adhering the white particles (B) and the color particles (C) to the surfaces of the red phosphorus-containing particles (A). Examples of such a resin include thermosetting resins such as a phenolic resin, a melamine resin, an epoxy resin, an unsaturated polyester resin, a phenol-formalin resin, an urea-formalin resin, a melamine-formalin resin, a furfuryl alcohol-formalin resin, and the like; organic polymers obtained by polymerization of monomers each having an unsaturated double bond, such as methacrylic acid and acrylic acid or esters thereof, styrene, vinyl acetate, acrylonitrile, and the like; insoluble polymers obtained by reaction of cationic water-soluble resins and nonionic surfactants or anionic surfactants; and the like.

In the present invention, the modified red phosphorus generally contains 50 to 90% by weight, preferably 50 to 80% by weight, of red phosphorus necessary for obtaining the flame-retardant polymer composition described below, which has the excellent flame retarding effect.

The modified red phosphorus of the present invention comprises the red phosphorus-containing particles (A) having the modified resin film (F) formed on the surfaces, the modified resin film (F) containing the white particles (B), the color particles (C) and the binder resin (D). The modified resin film (F) contains the white particles (B) and color particles (C) which are bonded to the surfaces of the red phosphorus-containing particles (A) with the binder resin (D).

With respect to the contents of the white particles (B) and the color particles (C) in the modified resin film (F) of the modified red phosphorus, the content of the white particles (B) is generally 10 to 50% by weight, and preferably 20 to 50% by weight, and the content of the color particles (C) is generally 0.1 to 5% by weight, and preferably 0.5 to 3% by weight, based on the total of the modified red phosphorus. In this case, a dark red color possessed by red phosphorus can be effectively concealed, and the flame retardancy can be sufficiently imparted to the flame-retardant polymer composition. Therefore, the modified red phosphorus is preferably used for the decolorized red phosphorus composition described below.

On the other hand, when the content of the white particles (B) is less than 10% by weight, the effect of concealing a dark red color possessed by red phosphorus is insufficient to leave the color of red phosphorus. With a content of over 50% by weight, the amount of the binder resin (D) necessary for bonding the white particles (B) is increased to easily cause adhesion and aggregation of the modified resin film (F) of the modified red phosphorus. Also, the modified red phosphorus is undesirably short of the effect of imparting flame retardancy.

When the content of the color particles (C) is less than 0.5% by weight, the effect of concealing a reddish hue possessed by red phosphorus is insufficient. With a content of over 5% by weight, the hue of the flame-retardant polymer composition undesirably readily becomes dark blue.

The content of the binder resin (D) contained in the modified resin film (F) of the modified red phosphorus according to the present invention is generally 1 to 20 parts by weight, and preferably 1 to 10 parts by weight, based on a total of 100 parts by weight of the white particles (B) and the color particles (C). The reason for this is that with the binder resin (D) at a content of less than 1 part by weight, the binder resin (D) has the low effect as a binder and a difficulty in strongly bonding the white particles (B) and the color particles (C) to the surfaces of the red phosphorus particles to be modified. On the other hand, with a content of over 20 parts by weight, the modified red phosphorus particles undesirably easily adhere to each other to aggregate.

The modified red phosphorus of the present invention generally has an average particle diameter of 1 to 100 μm, and preferably 1 to 30 μm, which is measured by laser diffractometry. The reason for this is that with an average particle diameter of less than 1 μm, the red phosphorus-containing particles (A) have high surface activity and are thus easily decomposed by oxidation, while with an average particle diameter of over 100 μm, the modified red phosphorus exhibits low dispersibility when mixed with a polymer compound, and thus the flame retardancy cannot be sufficiently imparted to the flame-retardant polymer composition.

The modified red phosphorus of the present invention can be used as a raw material of the decolorized red phosphorus composition which will be described below, a red phosphorus-type fame retardant to be mixed with a polymer composition, and the like.

(Method of Producing Modified Red Phosphorus)

The method of producing the modified red phosphorus of the present invention comprises performing a curing reaction for producing the binder resin (D) in an aqueous slurry containing the red phosphorus-containing particles (A), the white particles (B) having a whiteness of 70 or more, and the color particles (C) having a hue H of 30 to 80 in the Munsell color-system hue circle. The curing reaction for producing the binder resin (D) means a curing reaction for producing a raw material of the binder resin (D) used for producing the binder resin (D).

In the present invention, the red phosphorus-containing particles (A), the white particles (B) having a whiteness of 70 or more, and the color particles (C) having a hue H of 30 to 80 in the Munsell color-system hue circle are the same as those used for the modified red phosphorus.

The aqueous slurry can be prepared by mixing the red phosphorus-containing particles (A), the white particles (B) and the color particles (C) in water. In preparing the aqueous slurry, the addition order of the phosphorus-containing particles (A), the white particles (B) and the color particles (C) is not limited, and may be appropriately selected.

With respect to the amounts of the white particles (B) and the color particles (C) mixed in the aqueous slurry, the amount of the white particles (B) is generally 11 to 100 parts by weight, and preferably 25 to 100 parts by weight, based on 100 parts by weight of the red phosphorus-containing particles (A), and the amount of the color particles (C) is generally 0.5 to 10 parts by weight, and preferably 0.5 to 5 parts by weight, based on 100 parts by weight of the read phosphorus-containing particles (A). The reason for this is that with the white particles (B) and color particles (C) added in amounts in the above ranges, as described above, a dark red color possessed by red phosphorus can be effectively concealed, and flame retardancy can be sufficiently imparted to the flame-retardant polymer composition. On the other hand, with the white particles (B) added in an amount of less than 11 parts by weight, the effect of concealing a dark red color possessed by red phosphorus is undesirably low, while with the white particles added in an amount of over 100 parts by weight, the amount of the binder resin (D) necessary for bonding the white particles (B) is increased to cause adhesion of the modified resin film (F) containing a large amount of the binder resin (D), causing aggregation of the modified red phosphorus. Also, the modified red phosphorus undesirably tends to have the low effect of imparting flame retardancy. With the color particles (C) added in an amount of less than 0.5 part by weight, the effect of concealing a reddish hue possessed by red phosphorus is low, while with an amount of over 5 parts by weight, the whole hue undesirably readily becomes dark blue.

Examples of the curing reaction for producing the binder resin (D) in the aqueous slurry include (1) a polymerization reaction (referred to as a "first curing reaction" hereinafter) of a synthetic raw material of a thermosetting resin or an initial condensation product thereof, (2) a radical polymerization reaction (referred to as a "second curing reaction") of a monomer having an unsaturated double bond, and (3) a polymerization reaction (referred to as a "third curing reaction") of a cationic water-soluble resin in the presence of a nonionic surfactant or anionic surfactant. The methods of producing the modified red phosphorus using the first, second and third curing reactions are referred to as the third, second and third methods of the modified red phosphorus, respectively. These methods will be described in further detail below.

The first method of producing the modified red phosphorus uses a thermosetting resin as the binder resin (D), and comprises performing a curing reaction of a synthetic raw material or initial condensation product of the thermosetting resin in the aqueous slurry to form the modified resin film (F) comprising the white particles (B), the color particles (C) and the thermosetting resin on the surfaces of the red phosphorus-containing particles (A).

Examples of the thermosetting resin used in the first method of producing the modified red phosphorus include a phenolic resin, a melamine resin, an epoxy resin, an unsaturated polyester resin, a phenol-formalin resin, an urea-formalin resin, a melamine-formalin resin, a furfuryl alcohol-formalin resin, and the like.

In the present invention, the synthetic raw material of the thermosetting resin means a raw material in a state before a curing reaction of the thermosetting resin. Examples of the synthetic raw material of an epoxy resin include an epoxy resin base material having a plurality of diglycidyl groups, and a phenolic resin curing agent having a plurality of hydroxyl groups.

In the present invention, the initial condensation product of the thermosetting resin means a raw material in an intermediate stage of the curing reaction of the thermosetting resin before the final stage of the curing reaction.

An example of the first method of producing the modified red phosphorus will be described below. First, generally 50 to 150 parts by weight, preferably 80 to 120 parts by weight, of the red phosphorus-containing particles (A), generally 5 to 150 parts by weight, preferably 8 to 120 parts by weight, of the white particles (B), generally 0.25 to 15 parts by weight, preferably 0.25 to 7.5 parts by weight, of the color particles (C) are sufficiently dispersed in 1000 parts by weight of water to prepare an aqueous slurry. The ratios of the white particles (B) and the color particles (C) to the red phosphorus-containing particles (A) in the aqueous slurry are set in the above-described ranges.

The aqueous slurry can be prepared by, for example, preparing an aqueous slurry (referred to as an "A1 solution") containing the red phosphorus-containing particles (A) dispersed in water, and an aqueous slurry (referred to as a "B1 solution") containing the white particles (B) and the color particles (C) dispersed in water, and then adding the B1 solution to the A1 solution. The mixing ratio "1000 parts by weight of water" represents the amount of water contained in the mixture of the A1 solution and the B1 solution. Therefore, the mixing amounts of the red phosphorus-containing particles (A) in the A1 solution, and of the white particles (B) and the color particles (C) in the B1 solution are preferably previously set so that the mixing ratios of the red phosphorus-containing particles (A), the white particles (B) and the color particles (C) in the mixture of the A1 solution and B1 solution are in the above-described ranges.

After the A1 solution and B1 solution or the aqueous slurry is prepared, if necessary, a surfactant is preferably added to each of the solutions and then dispersed by an agitator having a strong shear force, such as a paint shaker, a ball mill, a dispersion mill, a colloid mill, a homogenizer, a vibrating mill, a sand grinder, a Nauta mixer, a ribbon blender, or the like, for sufficiently dispersing the components. In this case, the type of the surfactant used is not limited, and any one of an anionic surfactant, a cationic surfactant, and a nonionic surfactant may be used.

Next, the synthetic raw material or the initial condensation product of the thermosetting resin is added to the aqueous slurry, and polymerized under homopolymerization conditions for the thermosetting resin to coat the surfaces of the red phosphorus-containing particles (A) with the thermosetting resin containing the white particles (B) and the color particles (C).

The amount of the synthetic raw material or the initial condensation product of the thermosetting resin added to the aqueous slurry is generally 0.5 to 30 parts by weight, and preferably 0.5 to 15 parts by weight, in terms of solid content based on 100 parts by weight of the red phosphorus-containing particles (A).

For example, when the phenolic resin is used as the thermosetting resin, an alkali catalyst such as ammonia, sodium hydroxide, or the like, or an acidic catalyst such as hydrochloric acid, nitric acid, sulfuric acid, or the like may be added to the aqueous slurry, and then the predetermined amount of the phenolic resin (slid content) may be added to the slurry and subjected to a polymerization reaction under stirring at 60 to 90° C. for 1 to 3 hours.

After the reaction is completed, the resultant red phosphorus is washed and sufficiently dried generally at a temperature of 60 to 160° C. for 1 to 24 hours in an inert gas atmosphere of nitrogen gas or the like so as not to leave moisture, to obtain a product of modified red phosphorus.

The second method of producing the modified red phosphorus used, as the binder resin (D), a polymer of a monomer having an unsaturated double bond, and the method comprises performing a radical polymerization reaction of a monomer having an unsaturated double bond in the aqueous slurry to form the modified resin film (F) comprising the white particles (B), the color particles (C) and the polymer on the surfaces of the red phosphorus-containing particles (A).

The monomer used in the second method of producing the modified red phosphorus is not limited as long as radical polymerization is possible. Examples of the monomer include methacrylic acid and acrylic acid or esters thereof, styrene, vinyl acetate, acrylonitrile, and the like. Examples of methacrylic acid esters include lower alkyl esters of methacrylic acid, such as methyl methacrylate, ethyl methacrylate, isobutyl methacrylate, n-butyl methacrylate, t-butyl methacrylate, and the like. Examples of acrylic acid esters include lower alkyl esters of acrylic acid, such as methyl acrylate, ethyl acrylate, isobutyl acrylate, n-butyl acrylate, t-butyl acrylate, and the like.

When the modified red phosphorus is used as a flame retardant for an unsaturated polyester, and a coating is required to have chemical resistant to styrene, and the like, the monomer may be copolymerized with a crosslinking agent to produce the polymer having a cross-linked structure. The crosslinking agent comprises a polyfunctional monomer having at least two polymerizable double bonds in its molecule. Examples of such a crosslinking agent include ethylene dimethacrylate, diethylene glycol dimethacrylate, tetraethylene glycol dimethacrylate, 1,3-butylene dimethacrylate, trimethylolpropane trimethacrylate, and the like. These monomers can be used singly or in a combination of at least two monomers. In the use of the crosslinking agent, the amount of the crosslinking agent added is preferably 1 to 20 parts by weight based on 100 parts by weight of the monomer because of the excellent chemical resistance.

Examples of a polymerization initiator for the radical polymerization used in the second method of producing the modified red phosphorus include peroxides such as benzoyl peroxide, potassium peroxide, ammonium peroxide, hydrogen peroxide, and the like; azo compound initiators such as azobisisobutyronitrile, 2,2'-azobis-(2-amidinopropane) dihydrochloride, and the like; sulfurous acid water, sodium hydrogen sulfite, ammonium sulfite, sulfur dioxide gas, and the like. These initiators may be used singly or in a combination of at least two compounds.

An example of the second method of producing the modified red phosphorus will be described below. First, the same aqueous slurry as in the first method of producing the modified red phosphorus is prepared. The mixing ratios of the white particles (B) and the color particles (C) to the red phosphorus-containing particles (A) in the aqueous slurry are the same as those in the first method of producing the modified red phosphorus.

For the same reason as in the first method of producing the modified red phosphorus, if necessary, a surfactant is preferably added to the aqueous slurry in the same manner as in the first method, and then dispersed by the same agitator with strong shearing force as that used in the first method of producing the modified red phosphorus.

Next, for example, the monomer containing the unsaturated double bond, the polymerization initiator, and the crosslinking agent to be added according to demand are added to the aqueous slurry, and subjected to a radical polymerization reaction generally at 30 to 90° C. in an inert gas atmosphere of nitrogen gas or the like.

With respect to the amounts of the monomer and the polymerization initiator added to the aqueous slurry, and of the crosslinking agent added to the aqueous slurry according to demand, the amount of the monomer is generally 20 to 100 parts by weight, and preferably 35 to 85 parts by weight, the amount of the polymerization initiator is generally 0.2 to 10 parts by weight, and preferably 0.3 to 7.2 parts by weight, and the amount of the crosslinking agent is generally 0.9 to 22 parts by weight, based on 1000 parts by weight of water in the aqueous slurry.

The radical polymerization reaction is preferably performed in the aqueous slurry with a pH of 2 to 6 because the red phosphorus-containing particles (A) can be efficiently strongly coated with the white particles (B), the color particles (C) and the polymer. Therefore, for the aqueous slurry with a pH of over 6, hydrochloric acid, sulfuric acid, phosphoric acid, nitric acid, or the like is preferably added to control the pH of the aqueous slurry for the radical polymerization reaction.

After the reaction is completed, the resultant modified red phosphorus is washed and then dried in the same manner as in the first method of producing the modified red phosphorus to obtain a product of modified red phosphorus.

The third method of producing the modified red phosphorus uses, as the binder resin (D), an insoluble polymer obtained by a reaction of a cationic water-soluble resin and a nonionic surfactant or anionic surfactant. The method comprises performing a reaction of the cationic water-soluble resin and the nonionic surfactant or anionic surfactant in the aqueous slurry to form the modified resin film (F) comprising the white particles (A), the color particles (C) and the insoluble polymer on the surfaces of the red phosphorus-containing particles (A).

Examples of the cationic water-soluble resin used in the third method of producing the modified red phosphorus include a polyamide-epoxy resin, a polyamide-epichlorohydrin resin, a polyamine-epichlorohydrin resin, a polyamide-polyamine-polyether-epichlorohydrin resin, a polyamide-polyamine-polyester-polyether-epichlorohydrin resin, a polyethylene-imine polymer, a polyvinylamine-polyacrylamide-epichlorohydrin resin, and the like. These resins may be used singly or in a combination of at least two resins.

The nonionic surfactant used in the third method of producing the modified red phosphorus is not limited. Examples of the nonionic surfactant include polyoxyethylene oleyl ether, polyoxyethylene cetyl ether, polyoxyethylene stearyl ether, polyoxyethylene lauryl ether, polyoxyethylene nonylphenol ether, polyoxyethylene octylphenol ether, polyoxyethylene monolaurate, polyoxyethylene monostearate, polyoxyethylene monooleate, polyethylene glycol beef fatty acid esters, sorbitan monolaurate, sorbitan monopalmitate, sorbitan monostearate, sorbitan monooleate, sorbitan sesquioleate, sorbitan trioleate, polyoxyethylene sorbitan monolaurate, polyoxyethylene sorbitan monostearate, polyoxyethylene monooleate, an oxyethylene oxypropylene block polymer, glycerol monostearate, polyoxyethylene distearate, and the like. These compounds may be used singly or in a combination of at least two compounds.

The anionic surfactant used in the third method of producing the modified red phosphorus is not limited. Examples of the anionic surfactant include fatty acid soda soap, fatty acid potassium soap, stearic acid soap, alkyl ether sulfate (Na salt), sodium sulfonate, sodium n-dodecylbenzenesulfonate, sodium alkyl (sulfate) methyl taurinate, sodium oleyl methyl taurinate, sodium dioctyl sulfosuccinate, polycarboxylic acid, formalin condensation products of naphthalin sulfosuccinic acid salt, polyoxy sulfate salts, and the like. These compounds may be used singly or in a combination of at least two compounds. The nonionic surfactant and anionic surfactant may be combined.

An example of the third method of producing the modified red phosphorus will be described below. First, generally 50 to 150 parts by weight, preferably 80 to 120 parts by weight, of the red phosphorus-containing particles (A), and generally 0.25 to 3 parts by weight, preferably 0.5 to 2 parts by weight, of the cationic surfactant in terms of solid content are added to 1000 parts by weight of water to prepare an aqueous slurry (referred to as an "A3 solution" hereinafter). Also, generally 5 to 150 parts by weight, preferably 8 to 120 parts by weight, of the white particles (B), generally 0.25 to 15 parts by weight, preferably 0.25 to 7.5 parts by weight, of the color particles (C), and generally 0.25 to 3 parts by weight, preferably 0.25 to 2 parts by weight, of the nonionic or anionic surfactant are added to 1000 parts by weight of water to prepare an aqueous slurry (referred to as a "B3 solution" hereinafter). The ratio "1000 parts by weight of water" means the amount of water in a mixture of the A3 solution and B3 solution. Therefore, the mixing amounts of the red phosphorus-containing particles (A) in the A3 solution, and of the white particles (B) and the color particles (C) in the B3 solution are preferably previously set so that the mixing ratios of the red phosphorus-containing particles (A), the white particles (B) and the color particles (C) contained in the mixture of the A3 solution and B3 solution are in the above-described ranges.

Each of the A3 solution and B3 solution is preferably used in a state in which the components are sufficiently dispersed. For the same reason as that in the first method of producing the modified red phosphorus, if necessary, a surfactant is preferably added to the aqueous slurry in the same manner as in the first method, and then dispersed by the same agitator with strong shearing force as that used in the first method of producing the modified red phosphorus.

Next, the solution B3 is added to the A3 solution, and then reacted at generally 0 to 100° C., preferably 20 to 90° C., for generally 0.1 to 2 hours, preferably 0.5 to 1 hour.

The A3 solution may be a slurry containing the red phosphorus-containing particles (A) and the nonionic surfactant, and the B3 solution may be a slurry containing the white particles (B), the color particles (C) and the cationic water-soluble resin. The A3 solution may be added to the B3 solution and then reacted.

After the completion of the reaction, the resultant modified red phosphorus is washed and dried in the same manner as in the first method of producing the modified red phosphorus to obtain a product of modified red phosphorus.

In each of the first to third methods of producing the modified red phosphorus, washing after the completion of the reaction is preferably performed until the electric conductivity of a 10% of slurry of the resultant modified red phosphorus is generally 1000 $\mu$S/cm or less. With an electric conductivity of 1000 $\mu$S/cm or less, the modified red phosphorus can be used as a flame retardant for general-purpose articles such as building materials, wall paper, domestic articles, and the like. Furthermore, the modified red phosphorus washed until the electric conductivity is 50 to 300 $\mu$S/cm can be used as a flame retardant for, for example, electric wires, phenolic resin molding materials, a plywood adhesive, foamed polyethylene, and the like as well as the above-described applications. Particularly, the modified red phosphorus washed until the electric conductivity is 30 $\mu$S/cm or less, preferably 10 to 25 $\mu$S/cm, can be used as a flame retardant for electronic parts required to have severe electrical insulation, for example, a sealing material, a laminated sheet, a printed wiring board, a flat cable, a coil bobbin, a switch, a transformer member, a connector, and the like.

(Decolorized Red Phosphorus Composition)

Next, the decolorized red phosphorus composition of the present invention will be described. The decolorized red phosphorus of the present invention comprises a mixed powder containing the modified red phosphorus and the white particles (B) having a whiteness of 70 or more. The modified red phosphorus is referred to as "modified red phosphorus (G)" hereinafter. The white particles (B) used for the decolorized red phosphorus composition are the same as those used for the modified red phosphorus (G). For the white particles (B), normal salts or basic salts of titanium dioxide, zinc oxide, hydroxyapatite are preferably used because of the high ability to conceal a dark red color possessed by red phosphorus, and a normal salt of basic salt of titanium dioxide is more preferably used.

The mixing amount of the white particles (B) is generally 67 to 200 parts by weight, and preferably 67 to 167 parts by weight, based on 100 parts by weight of the modified red phosphorus (G). The reason for this is that with the white particles (B) mixed in an amount of less than 67 parts by weight, the effect of concealing a reddish hue of red phosphorus tends to decrease, while with the amount of over 200 parts by weight, the flame retarding effect undesirably tends to be low because of the low content of red phosphorus.

The decolorized red phosphorus composition of the present invention preferably further contains the color particles (C) for effectively decolorized red phosphorus. The color particles (C) used for the decolorized red phosphorus composition are the same as those used for the modified red phosphorus (G).

In the decolorized red phosphorus composition, the color particles (C) of phthalocyanine green, phthalocyanine blue, dichromium trioxide, ultramarine blue, or iron blue are preferred because of the high ability to conceal a deep dark red possessed by red phosphorus.

The color particles (C) are preferably appropriately fine particles from the viewpoint of dispersibility in the modified red phosphorus (G) and concealing power. Therefore, the average particle diameter generally determined by laser diffractometry is generally 0.2 to 10 $\mu$m, preferably 0.3 to 5 $\mu$m, and more preferably 0.3 to 1 $\mu$m. However, the average particle diameter of less than 0.2 $\mu$m is undesirable because of the low concealing power due to the excessively small diameter.

Although the amount of the color particles (C) added is not limited, the amount of the color particles (C) added to the decolorized red phosphorus composition is generally 0.5 to 5% by weight, and preferably 0.5 to 3% by weight.

The decolorized red phosphorus composition of the present invention preferably has physical properties such as a whiteness of generally 65 or more, and preferably 70 or more, which is measured by the powder whiteness meter, and a hue H of generally 20 to 80, and preferably 30 to 80, in the Munsell color-system hue circle. With the whiteness and hue H in the above ranges, the color particles (C) can decolorize a reddish color of red phosphorus because a color with whiteness and hue in these ranges is complementary to a dark red possessed by red phosphorus.

Besides the above physical properties, the content of red phosphorus in the decolorized red phosphorus composition is generally 20% by weight or more, and preferably 25 to 40% by weight, because the flame retarding effect can be improved by a small amount of red phosphorus.

The decolorized red phosphorus composition of the present invention is used as a mixed powder in which the modified red phosphorus (G), the white particle (B), and the color particles (C) added according to demand are mixed at the above-described ratios and uniformly dispersed. For example, the modified red phosphorus (G), the white particle (B), and the color particles (C) added according to demand are charged in a cone-type mixer such as a Nauta mixer, Ribocone, or the like, and mixed in a nitrogen atmosphere to form the decolorized red phosphorus composition containing the uniformly mixed components.

The decolorized red phosphorus composition with whiteness and hue H in the above ranges according to the present invention may further contain activated alumina, an inorganic ion exchanger, or the like as a trapping agent for oxoacid ions such as phosphate ions, phosphite ions, and the like.

The activated alumina used in the present invention preferably has a BET specific surface area of generally 50 $m^2/g$ or more, and preferably 70 to 400 $m^2/g$, and fine activated alumina is preferably used from the view point of uniform dispersibility with a resin and reactivity with a phosphorus oxoacid eluted. The average particle diameter generally measured by laser diffractometry is generally 15 μm or less, and preferably 0.5 to 10 μm.

As the inorganic ion exchanger, an inorganic anion exchange such as a hydrocalumite inorganic ion exchanger, a hydrotalcite inorganic ion exchanger, $BiO_x(OH)_y(NO_3)_z$ (x=0.9 to 1.1, y=0.6 to 0.8, z=0.2 to 0.4), $Mg_{4.3}Al_2(OH)_{12.6}CO_{3.3}\cdot 5H_2O$, $Sb_2O_5\cdot 2H_2O$, $SbSi_vBi_wO_x(OH)_y(N)_3)_z\cdot nH_2O$ (v=0.1 to 0.3, w=1.5 to 1.9, x=4.1 to 4.5, y=1.2 to 1.6, z=0.2 to 0.3, n=1 to 2), or the like can be used. The decolorized red phosphorus composition of the present invention can be mixed as a flame retardant with various resins.

(Flame-Retardant Polymer Composition)

The flame-retardant polymer composition of the present invention comprises the decolorized red phosphorus composition and a polymer compound (I). The decolorized red phosphorus composition is referred to as the "decolorized red phosphorus composition (H)" hereinafter.

The polymer compound (I) used in the present invention is not limited as long as it is commercially available. Examples of the polymer compound (I) include curing resins such as an epoxy resin, a phenolic resin, a polyurethane resin, a melamine resin, a urea resin, an aniline resin, a furan resin, an alkyd resin, a xylene resin, an unsaturated polyester resin, a diallyl phthalate resin, and the like; thermoplastic resins such as polyvinyl chloride, a polybutylene terephthalate resin, a polyethylene terephthalate resin, polycarbonate, polyphenylene oxide, polyphenylene ether, nylon 6, nylon 66, nylon 12, polyacetal, polyethylene, polypropylene, polybutadine, polyacrylonitrile, polystyrene, polymethyl methacrylate, polethylene oxide, polytetramethylene oxide, thermoplastic polyurethane, a phenoxy resin, polyamide, an ethylene/propylene copolymer, an ethylene/1-butene copolymer, an ethylene/propylene/nonconjugated diene copolymer, an ethylene/ethyl acrylate copolymer, an ethylene/glycidyl methacrylate copolymer, an ethylene/vinyl acetate/glycidyl methacrylate copolymer, an ethylene/propylene-g-maleic anhydride copolymer, a polyester polyether elastomer, polytetrafluoroethylene, and modified polymers thereof, and the like. These resins may be homopolymers or copolymers, and mixtures of at least two resins.

In the present invention, the curing resins include synthetic resins which develop a crosslinked structure, increase in molecular weight to show a three-dimensional network structure, and cure to be made semipermanently insoluble and infusible by a chemical change due to the action of heat, a catalyst or ultraviolet rays. Namely, the curing resins include thermosetting resins, catalytic curing resins, ultraviolet curing resins. Also, the thermoplastic resins include resins which show fluidity in heating and can be shaped by heating.

The polymer compound (I) used in the present invention may be rubber. Examples of rubber include natural rubber, styrene-butadiene rubber (SBR), acrylonitrile-butadiene rubber (NBR), butyl rubber (IIR), polybutadiene rubber (BR), ethylene-propylene rubber (EPMD), chlorobutylene rubber (CR), polyisobutylene rubber, acryl rubber, hydrogenated acrylonitrile-butadiene rubber, polysulfurized rubber, urethane rubber, chlorosulfonated rubber, silicone rubber, modified products thereof, and the like. These compounds may be used singly or in a combination of at least two compounds.

The polymer compound (I) used in the present invention may be a blend of at least two compounds selected from the curing resins, the thermoplastic resins, and the rubbers.

In the flame-retardant polymer composition of the present invention, the ratio of the decolorized red phosphorus composition (H) mixed is generally 2 to 20 parts by weight, and preferably 3 to 10 parts by weight, in terms of P based on 100 parts by weight of the polymer compound (I). The mixing ratio in this range is preferred because a product using the polymer composition has high flame retardancy.

The flame-retardant polymer composition of the present invention may contain a flame retardant other than the decolorized red phosphorus composition (H). Examples of the other flame retardant include a metal hydrate compound, a phosphorus flame retardant, a nitrogen-containing flame retardant, and the like.

The metal hydrate compound is a compound having a function to inhibit combustion by an endothermal reaction, and represented by $M_mO_n\cdot xH_2O$ (M represents a metal, m and n each represent an integer of 1 or more determined by the atomic valence of a metal, and x represents crystal water), and a double salt containing the compound. Examples of the metal hydrate compound include calcium hydroxide, magnesium hydroxide, basic magnesium carbonate, calcium hydroxide, barium hydroxide, zirconium hydroxide, dawsonite, zinc stannate, zinc borate, aluminum borate, basic zinc carbonate, borax, zinc molybdate, zinc phosphate, magnesium phosphate, hydrotalcite, hydrocalumite, kaolin, talc, sericite, pyroferrite, bentonite, kaolinite, calcium sulfate, zinc sulfate, and the like.

Examples of the nitrogen-containing flame retardant include melamine, melamine derivatives such as melamine cyanurate, methylol melamine, (iso)cyanuric acid, melam, melem, melon, succinoguamine, melamine sulfate, acetoguanamine sulfate, melam sulfate, guanylmelamine sulfate, melamine resins, BT resins, cyanuric acid, isocyanuric acid, isocyanuric acid derivatives, melamine isocyanurate, benzoguanamine, acetoguanamine, and the like, guanidine compounds, and the like.

Examples of the phosphorus flame retardant include triethyl phosphate, tricresyl phosphate, triphenyl phosphate, cresyl phenyl phosphate, octyl diphenyl phosphate, ethyl diethylenephosphate, butyl dihydroxypropylenephosphate, disodium ethylenephosphate, methylphosphonic acid, dimethyl methylphosphonate, diethyl methylphosphonate, ethylphosphonic acid, propylphosphonic acid, butylphosphonic acid, 2-methyl-propylphosphonic acid, t-butylphosphonic acid, 2,3-dimethylbutylphosphonic acid, octylphosphonic acid, phenylphosphonic acid, dioctylphenyl phosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, bis(4-methoxyphenyl)phosphinic acid, ammonium phosphate, ammonium polyphosphate, melamine phosphate, guanylurea phosphate, melamine polyphosphate, guanidine phosphate, ethylenediamine phosphoric acid salts, phosphazene, melamine methylphosphonate salts, and the like.

The other flame retardants may be used singly or in a combination of at least two retardants. As the other flame retardant, a metal hydrate compound is preferred for exhibiting a synergistic effect with the modified red phosphorus (G) in the decolorized red phosphorus composition (H). The amount of the other flame retardant added is generally 20 to 100 parts by weight, and preferably 20 to 60 parts by weight, based on 100 parts by weight of the decolorized red phosphorus composition (H) because the physical properties of a molded product of the flame retardant polymer composition do not deteriorate. Although the particle diameter of the other flame retardant is not limited, the average particle diameter generally measured by laser diffractometry is generally 100 µm or less, and preferably 1 to 30 µm.

The flame-retardant polymer composition of the present invention may further contain another component according to the purpose of its application. Examples of the other component include a phosphorus-type, ionic or hindered phenol antioxidant, a heat stabilizer, an ultraviolet absorber, a lubricant, a release agent, a colorant containing a dye or pigment, a crosslinking agent, a softening agent, a dispersant, and the like. However, the other component is not limited to these additives.

According to demand, a fibrous and/or granular filler may be added for significantly improving rigidity of the polymer compound (I). Examples of such a filler include glass fibers, carbon fibers, metal fibers, alamido fibers, asbestos, potassium titanate whiskers, wallastenite, glass flakes, glass beads, talc, mica, clay, calcium carbonate, calcium silicate, barium sulfate, titanium oxide, fused silica, crystalline silica, magnesia, aluminum oxide, and the like.

The other component and filler may be mixed in the polymer compound (I) in conventional ratios.

The method of mixing the decolorized red phosphorus composition (H) and the polymer compound (I) is not limited. As the mixing method, a master batch method in which the other flame retardant and other additives are previously mixed according to demand, if required, under heating, and then the resultant mixture is mixed with other components, or a method of simply mixing the components can be used. However, any one of the methods may be appropriately selected from the viewpoint of industrial advantages.

The flame-retardant polymer composition of the present invention can be molded by a conventional known method. For example, a molded product having any of shapes such as a sheet, a film, and the like can be formed by injection molding, extrusion molding, compression molding, blow molding, vacuum molding, press molding, calendering, foaming, or the like. For example, the molded products are advantageous for application to electric and electronic parts such as a laminated sheet, a sealing material, a flat cable, an electric cable coating material, various gears, various cases, a sensor, a LED lamp, a connector, a socket, a resistor, a relay case, a switch, a coil bobbin, a capacitor, a variable condenser case, a light pickup, an oscillator, various terminal strips, a transformer, a plug, a printed wiring board, a tuner, a speaker, a microphone, a headphone, a small motor, a magnetic head base, a power module, a housing, a semiconductor, a liquid crystal display part, a FDD carriage, FDD chassis, a HDD part, a motor brush holder, a parabolic antenna, a computer-related part, and the like; domestic and business electronic product parts such as a VTR part, a television part, an iron, a hair dryer, a rice cooker part, an electronic oven part, an acoustic part, audio equipment parts such as audio laser disk and compact disk, an illumination part, a refrigerator part, an air conditioner part, a typewriter part, a word processor part, and the like; office computer-related parts; telephone-related parts; facsimile-related parts; copying machine-related parts; a washing jig; various bearings such as an oil-less bearing, a stern gearing, a submerged bearing, and the like; machine-related parts such as motor parts, a lighter, a typewriter and the like; optical equipment and precision machine-related parts such as a microscope, a binocular telescope, a camera, a watch, and the like; an alternator terminal; an alternator connector; an IC regulator; a light gear potentiometer base; various valves such as an exhaust gas valve, and the like; various pipes for a combustion system, an exhaust system, and an induction system; an air intake nozzle snorkel; an intake manifold; a combustion pump; an engine cooling water joint; a carburetor main body; a carburetor spacer; an exhaust gas sensor; a cooling water sensor; an oil temperature sensor; a brake pat wear sensor; a throttle position sensor; a crank shaft position sensor; an air flow meter; a brake pat wearing sensor; an air conditioner thermostat base; a heating hot air flow control valve; a radiator motor brush holder; a water pump impeller; a turbine vain; wiper motor-related parts; a distributor; a starter switch; a starter relay; a transmission wire harness; a window washer nozzle; an air conditioner panel switch board; a combustion-related electromagnetic valve coil; a fuse connector; a horn terminal; an electrical component insulating plate; a stepping motor rotor; a lamp socket; a lamp reflector; a lamp housing; a brake piston; a solenoid bobbin; an engine oil filer; an ignition device case; wall paper; and the like. The application is not limited to these parts.

EXAMPLES

Although the present invention will be described in detail below with reference to examples, the present invention is not limited to these examples.

<Red Phosphorus-Containing Particles>

Production Example 1

Red phosphorus lumps were crushed and classified to obtain 500 g of red phosphorus particles A having an average particle diameter of 20 µm and a maximum particle diameter of 45 µm, and containing 2% by weight of particles having a diameter of less than 1 µm.

Production Example 2

20 g of red phosphorus particles A were dispersed in 180 g of pure water, and ammonia water was added to the dispersion under stirring to adjust a pH value to 10. Then, 2 g of phenolic resin (initial condensation product Phenolite TD2388 produced by Dainippon Ink Co., Ltd.; solid content 26%) was added to the dispersion. After stirring for 10 minutes after the completion of addition, hydrochloric acid was added to control the pH to 6 to 6.5.

Next, the mixture was reacted at 90° C. for 1 hour and then allowed to stand to cool. Thereafter, the reaction solution was filtered and washed until the electric conductivity of a 10% slurry at 20° C. was 100 μS/cm or less. The filtered cake was dried while being lightly dispersed under a reduced pressure, cured by heating at 140° C. for 2 hours, and then allowed to stand to cool. Then, the cake was passed through a 100-mesh filter to obtain stabilized red phosphorus B.

Production Example 3

200 g of the red phosphorus particles A were suspended in 1800 ml of pure water to prepare a red phosphorus slurry. Next, 100 ml of zinc sulfate aqueous solution containing 0.02 mole of a zinc sulfate was added to the resultant suspension, and then an ammonia aqueous solution was added to the mixture under stirring at a temperature of 80° C. until a pH was 8. After the completion of addition, the mixture was further continuously stirred at 80° C. for 1 hour while the pH value was controlled in the range of 7.0 to 7.5 with the ammonia aqueous solution to precipitate zinc hydroxide.

After the mixture was then allowed to stand to cool, the precipitate was filtered off and washed with pure water until the electric conductivity of a 10% slurry at 20° C. was 50 μS/cm or less. The filtered cake was dried while being lightly dispersed under reduced pressure, and then filtered through a 100-mesh filter to obtain stabilized red phosphorus C.

<White Particles>

As the white particles, particles of titanium dioxide (Tipaque CR-50; produced by Ishihara Sangyo Co., Ltd.) having an average particle diameter of 0.4 μm were used.

The whiteness of the titanium dioxide measured by a powder whiteness meter C-100 (Kett Electric Laboratory) was 87.6.

<Color Particles>

As the color particles, the following green pigment was used.

Green Pigment

Phthalocyanine green (trade name; Fastgen Green S, produced by Dainippon Ink Co., Ltd.); average particle diameter; average particle diameter of primary particles, 0.06 μm, particle diameter of secondary particles, 0.2 to 2 μm; hue H in the Munsell color-system hue circle, 54.4; whiteness, 21.7

TABLE 1

|  | Production Example 1 | Production Example 2 | Production Example 3 |
|---|---|---|---|
| Type of red phosphorus-containing particles | Red phosphorus particles A | Stabilized red phosphorus B | Stabilized red phosphorus C |
| Type of coating | No | Phenolic resin | Zinc hydroxide |
| Content of red phosphorus (%) | 100 | 98 | 95 |
| Average particle diameter (μm) | 18 | 18 | 18 |
| Maximum particle diameter (μm) | 45 | 45 | 45 |

TABLE 1-continued

|  | Production Example 1 | Production Example 2 | Production Example 3 |
|---|---|---|---|
| Whiteness | 10.6 | 8.3 | 10.8 |
| Hue H | 94.3 | 91.2 | 96.2 |

Example 1

100 g of the red phosphorus particles A were dispersed in 500 ml of water (A solution).

On the other hand, 1 g of a nonionic surfactant (Demol N; Kao Corporation) was dissolved in 50 ml of water, and 20 g of the white power and 1.0 g of the green pigment were dispersed in the resultant solution and them sufficiently dispersed by a paint shaker (B solution).

The B solution was slowly added to the A solution over a time of about 1 minute and then stirred at room temperature for 5 minutes. Then, ammonia water was added to the resultant slurry to control its pH to 9 to 10. Then, 12.0 g of phenolic resin (Phenolite TD2388; Dainippon Ink Co., Ltd., solid content 26%) was added to the slurry, and the pH was controlled to 5 to 7 with hydrochloric acid. Furthermore, 2.0 g of ammonium chloride was added to the slurry and then stirred at 90° C. for 1 hour. After the completion of a reaction, the slurry was filtered with pure water by a conventional method, and the filtered cake was washed with pure water until the electric conductivity of a 10% slurry at 20° C. was 100 μS/cm or less. After washing, the cake was dried by a vacuum dryer at 140° C. for 4 hours. The resultant modified red phosphorus had a red phosphorus content of 82.6%. Table 2 shows the main physical properties of the modified red phosphorus. The whiteness and hue were measured by a Munsell color-difference meter with a whiteness meter.

Example 2

100 g of the stabilized red phosphorus B were dispersed in 500 ml of water (A solution). 1.2 g of cationic water-soluble polyamide-epoxy resin (Sumirez Resin 650; Sumitomo Chemical Co., Ltd.) in terms of resin content was added to the resultant water dispersion, and then stirred for 30 minutes (A solution).

On the other hand, 1 g of a nonionic surfactant (Demol N, Kao Corporation) was dissolved in 50 ml of water, and 20 g of the white power and 1 g of the green pigment were dispersed in the resultant solution and then sufficiently dispersed by a paint shaker (B solution).

The B solution was slowly added to the A solution over a time of about 1 minute and then reacted by heating at 80° C. for 60 minutes. After the completion of the reaction, the slurry was filtered with pure water by a conventional method, and the filtered cake was washed with pure water until the electric conductivity of a 10% slurry at 20° C. was 100 μS/cm or less. After washing, the cake was dried at 110° C. for 6 hours. The resultant modified red phosphorus had a red phosphorus content of 80.2%. Table 2 shows the main physical properties of the modified red phosphorus. The whiteness and hue were measured by the Munsell color-difference meter with the whiteness meter.

Example 3

100 g of the stabilized red phosphorus B were dispersed in 500 ml of water in the same manner as in Example 2. 1.2 g of cationic water-soluble polyamide-epoxy resin (Sumirez Resin 650; Sumitomo Chemical Co., Ltd.) in terms of resin content was added to the resultant water dispersion, and then stirred for 30 minutes (A solution).

On the other hand, 1 g of a nonionic surfactant (Demol N, Kao Corporation) was dissolved in 50 ml of water, and 20 g of the white power and 3 g of the green pigment were dispersed in the resultant solution and then sufficiently dispersed by a paint shaker (B solution).

The B solution was slowly added to the A solution over a time of about 1 minute and then reacted by heating at 80° C. for 60 minutes. After the completion of the reaction, the slurry was filtered with pure water by a conventional method, and the filtered cake was washed with pure water until the electric conductivity of a 10% slurry at 20° C. was 100 µS/cm or less. After washing, the cake was dried at 110° C. for 6 hours. The resultant modified red phosphorus had a red phosphorus content of about 80%. Table 2 shows the main physical properties of the modified red phosphorus. The whiteness and hue were measured by the Munsell color-difference meter with the whiteness meter.

Example 4

The same operation as in Example 3 was performed except that the amount of the green pigment added to the B solution was 2 g to obtain modified red phosphorus. Table 2 shows the main physical properties of the resultant modified red phosphorus. The whiteness and hue were measured by the Munsell color-difference meter with the whiteness meter.

Example 5

100 g of the stabilized red phosphorus C were dispersed in 500 ml of water (A solution). 1.2 g of a cationic water-soluble polyamide-epoxy resin (Sumirez Resin 650; Sumitomo Chemical Co., Ltd.) in terms of resin content was added to the resultant water dispersion, and then stirred for 30 minutes (A solution).

On the other hand, 1 g of a nonionic surfactant (Demol N, Kao Corporation) was dissolved in 50 ml of water, and 20 g of the white power and 1 g of the green pigment were dispersed in the resultant solution and then sufficiently dispersed by a paint shaker (B solution).

The B solution was slowly added to the A solution over a time of about 1 minute and then reacted by heating at 80° C. for 60 minutes. After the completion of the reaction, the slurry was filtered with pure water by a conventional method, and the filtered cake was washed with pure water until the electric conductivity of a 10% slurry at 20° C. was 100 µS/cm or less. After washing, the cake was dried at 110° C. for 6 hours. The resultant modified red phosphorus had a red phosphorus content of 80.2%. Table 2 shows the main physical properties of the modified red phosphorus. The whiteness and hue were measured by the Munsell color-difference meter with the whiteness meter.

Comparative Example 1

The same operation as in Example 3 was performed except that the B solution contained only the white powder without containing the green pigment to obtain modified red phosphorus. Table 2 shows the main physical properties of the resultant modified red phosphorus. The whiteness and hue were measured by the Munsell color-difference meter with the whiteness meter.

TABLE 2

| Type of modified red phosphorus | Example 1 | Example 2 | Example 3 | Example 4 | Example 5 | Comparative Example 1 |
|---|---|---|---|---|---|---|
| Type of red phosphorus-containing particles | Red phosphorus particles A | Stabilized red phosphorus B | Stabilized red phosphorus B | Stabilized red phosphorus B | Stabilized red phosphorus C | Stabilized red phosphorus B |
| Amount of red phosphorus-containing particles mixed (parts by weight) | 100 | 100 | 100 | 100 | 100 | 100 |
| Amount of white powder mixed (parts by weight) | 20 | 20 | 20 | 20 | 20 | 20 |
| Amount of color particles mixed (parts by weight) | 1 | 1 | 3 | 2 | 1 | 0 |
| Type of binder resin | Phenolic resin | Polyamide-epoxy resin | Polyamide-epoxy resin | Polyamide-epoxy resin | Polyamide-epoxy resin | Polyamide-epoxy resin |
| Amount of binder resin mixed (parts by weight) | 3.12 | 1.2 | 1.2 | 1.2 | 1.2 | 1.2 |
| Content of red phosphorus (% by weight) | 82.6 | 80.2 | 80.0 | 80.1 | 80.2 | 80.8 |
| Whiteness | 67.2 | 69.3 | 65.5 | 67.7 | 69.0 | 70.3 |
| Hue H | 23.4 | 24.2 | 29.1 | 27.5 | 25.0 | 16.2 |

TABLE 2-continued

| Type of modified red phosphorus | Example 1 | Example 2 | Example 3 | Example 4 | Example 5 | Comparative Example 1 |
|---|---|---|---|---|---|---|
| Average particle diameter (μm) | 18 | 18 | 18 | 18 | 18 | 18 |
| Maximum particle diameter (μm) | 45 | 45 | 45 | 45 | 45 | 45 |

The results shown in Table 2 indicate that the modified red phosphorus of the present invention has a yellow (Y) hue not tinted with red, while the modified red phosphorus comprising a coating component not containing the green pigment in Comparative Example 1 has an orange (YR) hue tinted with red.

<Decolorized Red Phosphorus Composition>

Examples 6 to 11 and Comparative Example 2

The white powder and green pigment in the amounts shown in Table 3 were added to 100 parts by weight of the modified red phosphorus obtained in each of Examples 1 to 5 and Comparative Example 1 to obtain a decolorized red phosphorus composition. Table 3 shows the main physical properties of the obtained decolorized red phosphorus compositions.

TABLE 3

| Type of decolorized red phosphorus composition | Example 6 | Example 7 | Example 8 | Example 9 | Example 10 | Example 11 | Comparative Example 2 |
|---|---|---|---|---|---|---|---|
| Type of modified red phosphorus | Example 1 | Example 1 | Example 2 | Example 3 | Example 4 | Example 5 | Comparative Example 1 |
| Amount of modified red phosphorus mixed (parts by weight) | 100 | 100 | 100 | 100 | 100 | 100 | 100 |
| Amount of white powder mixed (parts by weight) | 148 | 148.5 | 140.5 | 139.9 | 140.2 | 140.5 | 144.8 |
| Amount of green pigment mixed (parts by weight) | 0 | 2.5 | 2.5 | 2.5 | 2.5 | 2.5 | 0 |
| Content of red phosphorus (% by weight) | 33.3 | 32.9 | 33.3 | 33.0 | 33.0 | 33.0 | 33.0 |
| Whiteness | 84.1 | 83.9 | 83.4 | 82.4 | 81.3 | 81.6 | 82.6 |
| Hue H | 31.6 | 35.7 | 33.4 | 72.3 | 74.6 | 74.7 | 13.2 |

The results shown in Table 3 indicate that the decolorized red phosphorus compositions of the present invention have a hue from green-yellow (GY) to blue (PB) not tinted with red, and excellent whiteness due to decolorization, while the decolorized red phosphorus composition of Comparative Example 2 has an orange (YR) hue tinted with red.

Furthermore, 0.5 g of each of the decolorized red phosphorus compositions obtained in Examples 6 to 11 and Comparative Example 2, and the stabilized red phosphorus B prepared in Production Example 2 and the stabilized red phosphorus C prepared in Example 3 was collected by an alumina board, placed in a test tube and then heated in a nitrogen gas at 250° C. for 1 hour. The amount of the $PH_3$ gas generated was collected by a Tedler bag and measured by a detector tube. The results are shown in Table 4.

TABLE 4

| Type of decolorized red phosphorus composition | Amount of phosphine gas generated (ppm) |
|---|---|
| Example 6 | 21 |
| Example 7 | 20 |
| Example 8 | 6.3 |
| Example 9 | 7.1 |
| Example 10 | 6.2 |
| Example 11 | 7.0 |

TABLE 4-continued

| Type of decolorized red phosphorus composition | Amount of phosphine gas generated (ppm) |
|---|---|
| Comparative Example 2 | 7.3 |
| Stabilized red phosphorus B | 21 |
| Stabilized red phosphorus C | 20 |

The results shown in Table 4 indicate that the decolorized red phosphorus compositions of the present invention generate 30 ppm or less of phosphine, and are thus at a practical level without any problem.

<Flame-Retardant Polymer Composition>

Examples 12 to 17 and Comparative Examples 3 to 5

Each of the decolorized red phosphorus compositions obtained in Examples 6 to 11 and Comparative Example 2 and the stabilized red phosphorus B obtained in Production Example 2 or the stabilized red phosphorus C obtained in Production Example 3 was mixed with a low-density polyethylene resin (LDPE resin) so that the P content of the resin was 20% by weight, and then pelletized by an extruder. The pellets were molded by injection molding to form a molded sheet having a thickness of 1 mm. The whiteness and hue of the molded sheet were measured by the Munsell color-difference meter with the whiteness meter. The results are shown in Table 5.

The conditions for resin molding were as follows.

30 g of the LDPE resin and 45.9 g of a sample were blended on a roll at 100 to 105° C. for 5 minutes, and then the resultant sheet was separated from the roll. Then, two sheets were laminated and pressed by a mold having a thickness of 1 mm at 200 kg/cm² at 105° C. for 3 minutes.

TABLE 5

| Type of flame-retardant polymer composition | Type of decolorized red phosphorus composition | Content of red phosphorus in flame-retardant polymer composition (% by weight) | Whiteness | Hue H |
|---|---|---|---|---|
| Example 12 | Example 6 | 20 | 72.7 | 1.8 |
| Example 13 | Example 7 | 20 | 72.6 | 1.6 |
| Example 14 | Example 8 | 20 | 72.4 | 1.5 |
| Example 15 | Example 9 | 20 | 72.1 | 1.7 |
| Example 16 | Example 10 | 20 | 70.9 | 3.7 |
| Example 17 | Example 11 | 20 | 70.5 | 3.8 |
| Comparative Example 3 | Comparative Example 2 | 20 | 64.8 | 92.4 |
| Comparative Example 4 | Stabilized red phosphorus B | 20 | 38.1 | 5.2 |
| Comparative Example 5 | Stabilized red phosphorus C | 20 | 37.3 | 3.6 |

The results shown in Table 5 indicate that the LDPE resin containing the decolorized red phosphorus composition of the present invention is light red, while the LDPE resin containing the decolorized red phosphorus composition of Comparative Example 2 is purplish red (PR).

Examples 18 to 23 and Comparative Examples 6 to 8

Each of the decolorized red phosphorus compositions obtained in Examples 6 to 11 and Comparative Example 2 and the stabilized red phosphorus B obtained in Production Example 2 or the stabilized red phosphorus C obtained in Production Example 3 was mixed with a soft vinyl chloride compound so that the P content of the resin was 1% by weight, and then kneaded with a hot roll. The resultant blend was pressed at 155° C. at 100 kg/cm² for 4 minutes to form a molded sheet having a thickness of 1 mm. The whiteness and hue of the molded sheet were measured by the Munsell color-difference meter with the whiteness meter. The results are shown in Table 6.

TABLE 6

| Type of flame-retardant polymer composition | Type of decolorized red phosphorus composition | Content of red phosphorus in resin (% by weight) | Whiteness | Hue H |
|---|---|---|---|---|
| Example 18 | Example 6 | 1 | 66.7 | 14.4 |
| Example 19 | Example 7 | 1 | 66.9 | 14.1 |
| Example 20 | Example 8 | 1 | 67.4 | 13.8 |
| Example 21 | Example 9 | 1 | 67.0 | 13.1 |
| Example 22 | Example 10 | 1 | 65.5 | 12.5 |
| Example 23 | Example 11 | 1 | 65.5 | 10.9 |
| Comparative Example 6 | Comparative Example 2 | 1 | 63.5 | 7.3 |
| Comparative Example 7 | Stabilized red phosphorus B | 1 | 43.3 | 2.1 |
| Comparative Example 8 | Stabilized red phosphorus C | 1 | 42.6 | 1.7 |

The results shown in Table 6 indicate that the soft vinyl chloride resin containing the decolorized red phosphorus composition of the present invention is decolorized to assume an orange (YR) color, while the resin containing the decolorized red phosphorus composition of Comparative Example 2 assumes a red (R) color.

(Evaluation of Flame Retardancy)

Examples 24 and 25 and Comparative Example 9

An EVA (ethylene-vinyl acetate copolymer) resin (Mitsui Dupont Chemical, Evaflex EV270) and the decolorized red phosphorus composition of Example 7 were mixed in each of the ratios shown in Table 7, kneaded with a hot roll (200° C.), and then molded into a sheet to form a specimen of 1 mm in thickness×125 mm in length×12.5 mm in width.

The specimen was subjected to a flame retardancy test according to UL-94 standards. The results are shown in Table 7.

TABLE 7

| | Comparative Example 9 | Example 24 | Example 25 |
|---|---|---|---|
| EVA resin (parts by weight) | 100 | 100 | 100 |
| Decolorized red phosphorus composition (parts by weight) | 0 | 17.8 | 29.4 |
| P content (parts by weight) | 0 | 5.0 | 7.5 |
| Acceptability to UL-94 | Nonacceptable | V-0 | V-0 |

Examples 26 and 27 and Comparative Example 10

A phenolic resin curing agent (Gunei Chemical Industry Co., Ltd., PMS261), a curing catalyst (triphenyl phosphine, Hokko Chemical Industry Co., Ltd.), a release agent (wax produced by Clariant Co., Ltd.), a coloring agent (carbon black, Mitsubishi Chemical Corporation), an inorganic filler (fused silica produced by Nippon Chemical Industrial Co., Ltd.) and the decolorized red phosphorus composition of Example 7 were mixed with an epoxy resin (Yuka Shell YX-4000H) in each of the ratios shown in Table 8 by a mixer at room temperature, kneaded with a biaxial hot roll at 80 to 85° C. for 7 minutes, and then molded by a transfer molding machine at a molding temperature of 175° C. at a molding resin pressure of 7 MPa (70 kg/cm²) for a molding time of 120 seconds to form a specimen of 1 mm in thickness×125 mm in length×12.5 mm in width.

The specimen was subjected to a flame retardancy test according to UL-94 standards. The results are shown in Table 8.

TABLE 8

|  | Comparative Example 10 | Example 26 | Example 27 |
|---|---|---|---|
| Epoxy resin (parts by weight) | 100 | 100 | 100 |
| Phenolic resin curing agent (parts by weight) | 54 | 54 | 54 |
| Curing catalyst (parts by weight) | 2 | 2 | 2 |
| Release agent (parts by weight) | 1 | 1 | 1 |
| Coloring agent (parts by weight) | 1 | 1 | 1 |
| Inorganic filler (parts by weight) | 632 | 632 | 632 |
| Decolorized red phosphorus composition (parts by weight) | 0 | 12.2 | 19.7 |
| P content in composition (% by weight) | 0 | 0.5 | 0.8 |
| Acceptability to UL-94 | Nonacceptable | V-0 | V-0 |

As described above, a decolorized red phosphorus composition using modified red phosphorus according to the present invention shows the suppressed generation of phosphine gas, and shows suppressed coloring of a resin having a dark red color peculiar to red phosphorus when kneaded with a polymer compound such as a resin or the like and then molded. Therefore, the modified red phosphorus of the present invention can be used as a flame retardant in various fields in which the use of modified red phosphorus is conventionally limited.

The invention claimed is:

1. A modified red phosphorus comprising red phosphoruscontaining particles whose surfaces are coated with a modified resin film containing white particles having a whiteness of 70 or more, color particles having a hue H of 30 to 80 in the Munsell color-system hue circle, and a binder resin.

2. A modified red phosphorus according to claim 1, wherein the red phosphoruscontaining particles are at least one type selected from the group consisting of red phosphorus particles, stabilized red phosphorus comprising the red phosphorus particles whose surfaces are coated with an inorganic material, stabilized red phosphorus comprising the red phosphorus particles whose surfaces are coated with a thermosetting resin, and double-coated stabilized red phosphorus comprising the red phosphorus particles whose surfaces are coated with the inorganic material and further coated with the thermosetting resin.

3. A modified red phosphorus according to claim 1, wherein the content of the white particles is 10 to 50% of a total weight of the modified red phosphorus, and the content of the color particles is 0.1 to 5.0% of the total weight of the modified red phosphorus.

4. A modified red phosphorus according to claim 1, wherein the average particle diameter is 1 to 100 μm.

5. A modified red phosphorus according to claim 1, wherein the red phosphorus content is 50 to 90% of a total weight of the modified red phosphorus.

6. A modified red phosphorus according to claim 1, wherein the white particles are composed of titanium dioxide.

7. A modified red phosphorus according to claim 1, wherein the color particles are at least one of green particles and blue particles.

8. A modified red phosphorus according to claim 1, wherein the color particles are particles of at least one pigment selected from the group consisting of phthalocyanine green, phthalocyanine blue, dichromium trioxide, ultramarine blue, and iron blue.

9. A method for producing modified red phosphorus, said method comprising the steps of:
providing an aqueous slurry containing red phosphorus-containing particles, white particles having a whiteness of 70 or more, and color particles having a hue H of 30 to 80 in the Munsell color-system hue circle;
combining a binder resin with the aqueous slurry; and
curing the binder resin containing the red phosphorus-containing particles, the white particles having a whiteness of 70 or more, and the color particles having a hue H of 30 to 80 in the Munsell color-system hue circle.

10. A method for producing modified red phosphorus according to claim 9, wherein said step of curing of the binder resin includes using at least one of a polymerization reaction of a synthetic raw material and an initial condensation product of a thermosetting resin.

11. A method for producing modified red phosphorus according to claim 9, wherein said step of curing the binder resin includes using a radical polymerization reaction of a monomer having an unsaturated double bond.

12. A method for producing modified red phosphorus according to claim 9, wherein said step of curing the binder resin includes using a polymerization reaction of a cationic water-soluble resin in the presence of a nonionic surfactant or anionic surfactant.

13. A method for producing modified red phosphorus according to claim 10, wherein said step of curing the binder resin includes using a phenolic resin.

14. A method for producing modified red phosphorus according to claim 12, wherein said step of curing the binder resin includes using a polyamide-epoxy resin.

15. A decolorized red phosphorus composition comprising a mixed powder containing modified red phosphorus, said modified red phosphorus comprising red phosphorus-containing particles whose surfaces are coated with a modified resin film containing white particles having a whiteness of 65 or more, color particles having a hue H of 30 to 80 in the Munsell color-system hue circle, and a binder resin.

16. A decolorized red phosphorus composition according toclaim 15, wherein the whiteness is at least 70.

17. A decolorized red phosphorus composition according to claim 15, wherein the hue H in the Munsell color-system hue circle is 38 to 78.

18. A decolorized red phosphorus composition according to claim 15, wherein the red phosphorus content is at least 20% of a total weight of the modified red phosphorus.

19. A decolorized red phosphorus composition according to claim 15, wherein the white particles are composed of titanium dioxide.

20. A decolorized red phosphorus composition according to claim 15, wherein the color particles are at least one of green particles and blue particles.

21. A flame-retardant polymer composition comprising a decolorized red phosphorus composition and a polymer compound (I), said red phosphorus composition comprising a mixed powder containing modified red phosphorus, said modified red phosphorus comprising red phosphorus-containing particles whose surfaces are coated with a modified resin film containing white particles having a whiteness of 65 or more, color particles having a hue H of 30 to 80 in the Munsell color-system hue circle, and a binder resin.

* * * * *